No. 796,195. PATENTED AUG. 1, 1905.
W. A. DICKEY.
MOLD FOR PLASTIC ARTICLES.
APPLICATION FILED MAR. 1, 1905.
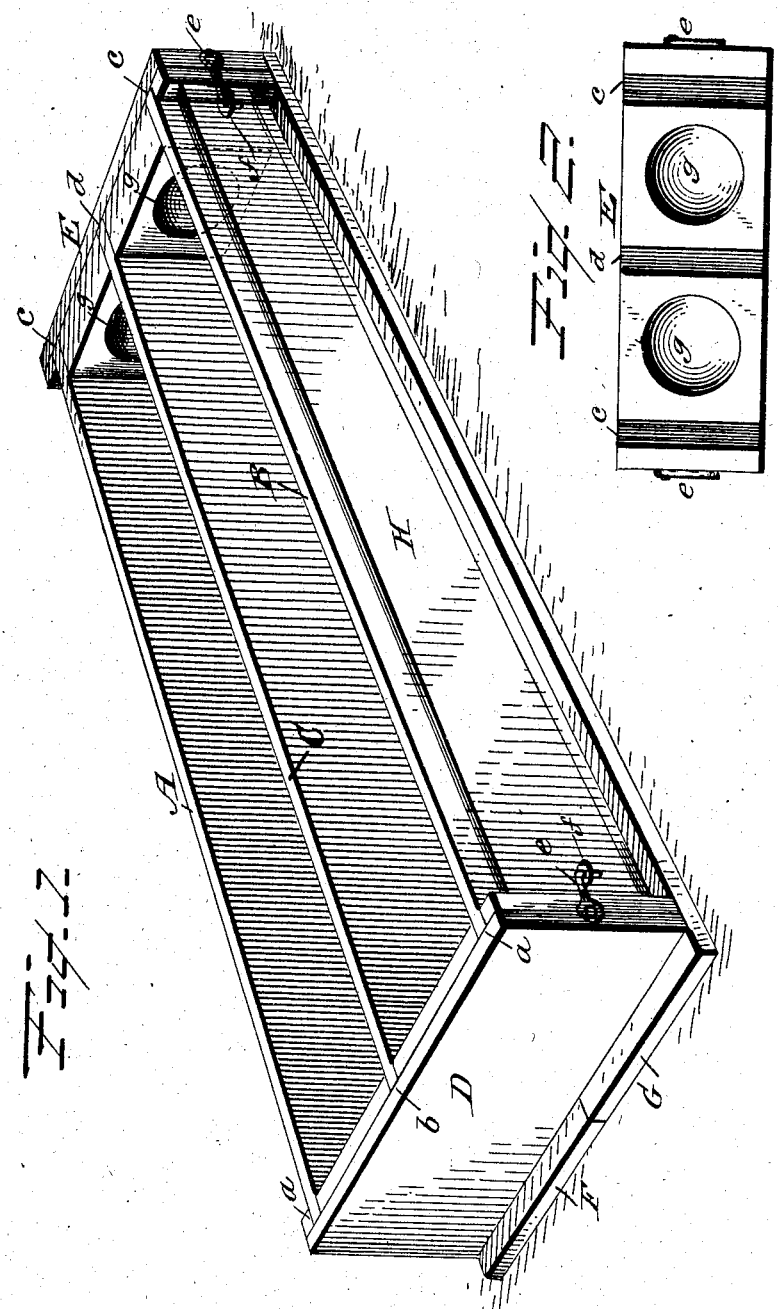
WITNESSES
INVENTOR
William A. Dickey,
per Chas. H. Fowler
Attorney

UNITED STATES PATENT OFFICE.

WILLIAM A. DICKEY, OF NORTH MANCHESTER, INDIANA.

MOLD FOR PLASTIC ARTICLES.

No. 796,195.         Specification of Letters Patent.         Patented Aug. 1, 1905.

Application filed March 1, 1905. Serial No. 247,860.

*To all whom it may concern:*

Be it known that I, WILLIAM A. DICKEY, a citizen of the United States, residing at North Manchester, in the county of Wabash and State of Indiana, have invented certain new and useful Improvements in Molds for Plastic Articles; and I do hereby declare that the following is a full, clear, and exact description of the same, reference being had to the annexed drawings, making a part of this specification, and to the letters of reference marked thereon.

The present invention has relation to the molds for plastic articles—such as fence-posts, gate-posts, hitching-posts, and similar objects—and the purpose thereof is to provide a mold simple in construction as well as possessing strength and durability, said mold comprising separable sections adapted to be set up and securely held together to form a complete mold, and after the plastic material has been placed therein and allowed to set the several sections are separated and removed, leaving the molded object supported upon the platform, which forms the bottom section of the mold.

The invention consists in a mold for plastic articles constructed substantially as shown in the drawings and hereinafter described and claimed.

Figure 1 of the drawings is a perspective view of a mold constructed in accordance with my invention; Fig. 2, an inner side view of the end sections having the dies thereon.

In the accompanying drawings, A B represent the two outer side sections of the mold, which form the outer walls thereto, and C is the central partition, the side sections and partition engaging grooves in the end sections D E and the several sections and partition resting upon separable platforms F G, which form together the bottom of the mold.

The mold herein shown and described is especially adapted for molding fence-posts, and although I have shown the mold as adapted to the manufacture of two posts only it is evident that the end sections may be of sufficient length, with the required number of grooves, to receive any desired number of partitions, so that a plurality of posts may be molded at the same time.

The end section D has grooves *a* for the ends of the outer side sections A B and groove *b* for the end of the central partition C, and the end section E has similar grooves *c* and central groove *d* for the opposite ends of the side sections and partition, the side sections and partition and the end sections being held together by hooks *e* engaging eyes *f*. Any suitable fastening device may be substituted for the hooks and eyes shown that will serve the purpose intended, and the end section E have suitably-formed dies *g* to give ornamentation to the end of the post in any suitable design.

After the plastic material is placed in the mold the pressure upon each side of the central partition C will be equal, and consequently there is no danger of the collapse or bending of the partition; but with the side sections A B it is different, the pressure being outward only upon the inner side thereof, and therefore it is necessary to reinforce the side sections so as to resist the outward pressure of the plastic material. Consequently the side sections have a longitudinal brace connected thereto, as indicated at H, to strengthen and render the sections more rigid and better enabled to resist the outward pressure thereon.

After the mold is set up ready for use, as shown in Fig. 1 of the drawings, the plastic material is placed in the spaces between the side sections and central partition to form the post. After the plastic material has become sufficiently set the fastening devices are released and the end sections removed, after which the side sections are removed and then the central partition, leaving the molded posts supported upon the platforms, which form the bottom of the mold. In the employment of the platforms, which form the bottom of the mold, the post is enabled to be removed in its brittle condition without injury thereto.

It is evident that many changes or modifications in the general construction and form of the mold may be resorted to without in any manner departing from the essential features of the invention, and such changes could be made as would come within ordinary mechanical judgment.

Having now fully described my invention, what I claim as new, and desire to secure by Letters Patent, is—

In a mold for plastic articles, a platform upon which said mold rests, said platform comprising longitudinal and separable sections, separable side sections having longitudinal braces upon their outer sides to reinforce and strengthen the same against the outward pressure thereon of the plastic material, separable end sections with grooves therein with which the side sections engage, a partition located between the side sections and engaging grooves in the end sections, one of said end sections having dies, and means for holding the sections together upon the platform, substantially as and for the purpose set forth.

In testimony whereof I affix my signature in presence of two witnesses.

WILLIAM A. DICKEY.

Witnesses:
 JOHN L. FLETCHER,
 WM. W. BURLEIN.